United States Patent [19]
Payne

[11] 4,128,803
[45] Dec. 5, 1978

[54] METAL DETECTOR SYSTEM WITH GROUND EFFECT REJECTION

[75] Inventor: George C. Payne, Tempe, Ariz.

[73] Assignee: PNI, Inc., Tempe, Ariz.

[21] Appl. No.: 790,385

[22] Filed: Apr. 29, 1977

[51] Int. Cl.² .................. G01V 3/10; G01R 33/02
[52] U.S. Cl. .................................. 324/3; 324/233; 324/239
[58] Field of Search ............... 324/3, 4, 6, 40, 41; 340/285C, 280

[56] References Cited

U.S. PATENT DOCUMENTS

| | | | |
|---|---|---|---|
| 3,147,429 | 9/1964 | Moran | 324/6 |
| 3,179,879 | 4/1965 | Tanguy | 324/6 |
| 3,405,354 | 10/1968 | Callan et al. | 324/40 |
| 3,566,258 | 2/1971 | Mori et al. | 324/40 |
| 3,614,600 | 10/1971 | Ronka | 324/4 |
| 3,676,772 | 7/1972 | Lee | 324/41 |
| 3,686,564 | 8/1972 | Mallick et al. | 324/41 |
| 3,848,182 | 11/1974 | Gerner et al. | 324/40 |
| 3,990,065 | 11/1976 | Purinton et al. | 324/41 X |
| 4,030,026 | 6/1977 | Payne | 324/3 |

OTHER PUBLICATIONS

LeGaye, E. S., Induction Balance Detector, *Electronic Metal Detector Handbook*, Western Heritage Press, Mar. 1975, pp. 95, 96.

*Primary Examiner*—Gerard R. Strecker
*Attorney, Agent, or Firm*—LaValle D. Ptak

[57] ABSTRACT

A metal detector uses a transmitting search coil inductively coupled to a receiving coil for detecting the presence of metal objects near the surface of the ground within the field of the coils. An oscillator generates a signal transmitted by the transmit coil, and the signals detected by the receive coil are coupled to the signal inputs of two synchronous demodulators. The output of the oscillator also is applied at different phases to the reference signal inputs of the two synchronous demodulators. The outputs of these demodulators then are passed through low pass and bandpass filters having a low cutoff frequency which is higher than the highest frequency components generated in the synchronous demodulators due to ground effects. The signals passing through the bandpass filters then are applied respectively to the signal input and reference signal input of a third synchronous demodulator, the output signal of which has an amplitude representative of the presence of metal objects and the polarity of which is an indication of the type of metal being detected. Undesired signals produced by ground effects are reduced by a considerable amount, and the output of the third synchronous demodulator is applied to a suitable indicator circuit.

10 Claims, 6 Drawing Figures

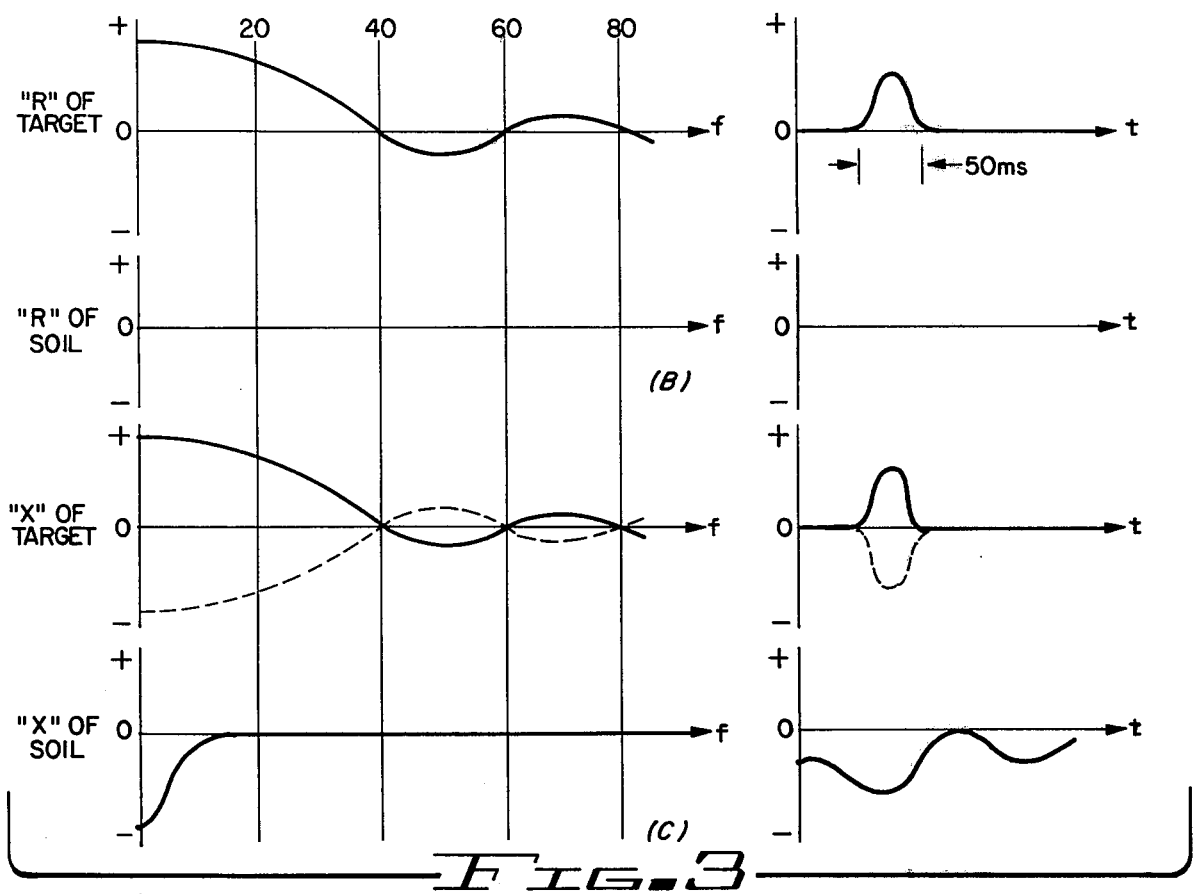
FIG-3
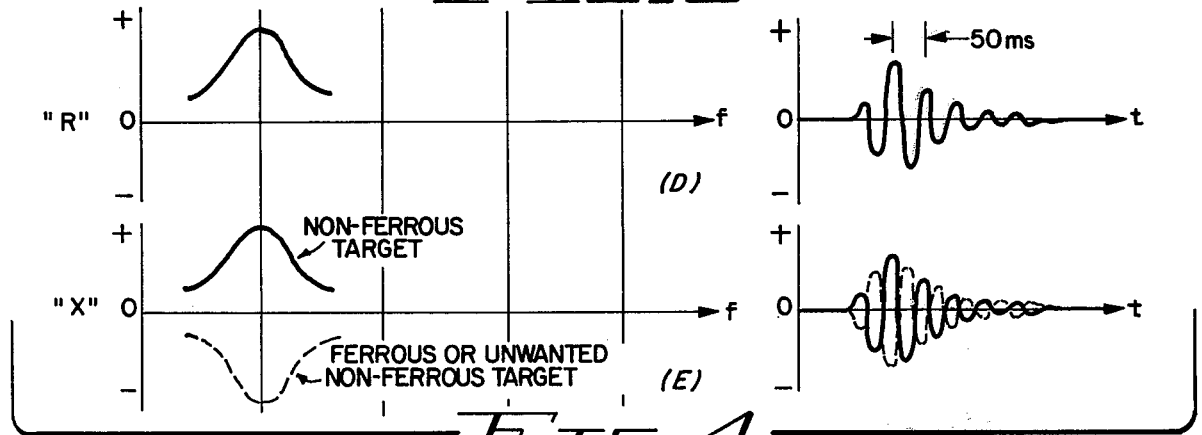
FIG-4
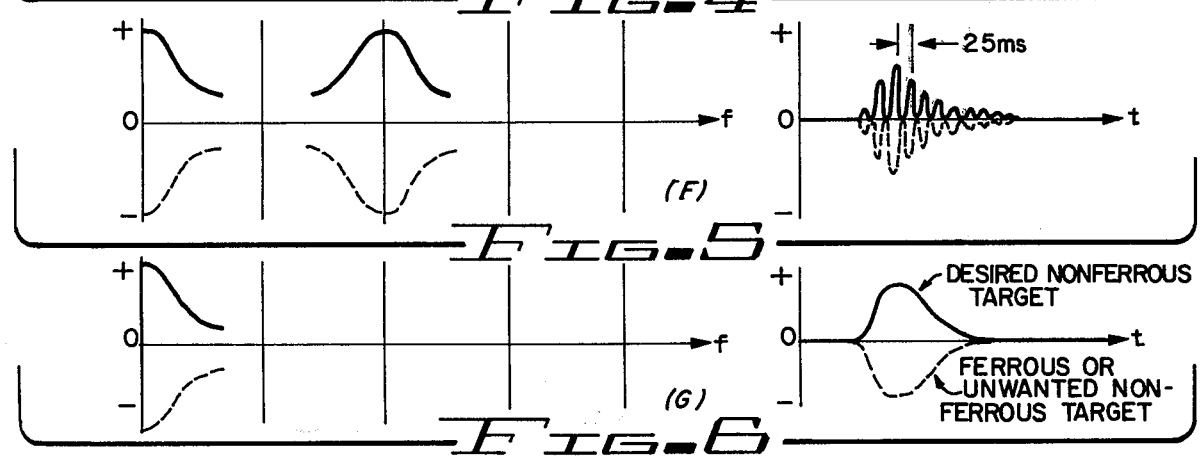
FIG-5
FIG-6

METAL DETECTOR SYSTEM WITH GROUND EFFECT REJECTION

BACKGROUND OF THE INVENTION

Portable hand-held metal detectors for searching and finding metal objects lying on or near the surface of the ground or buried just beneath the surface of the ground are becoming increasingly popular. Such detectors are moved or swept over the surface of the ground in front of the operator; and when the detector passes over a metal object, the disturbance of a magnetic field is used to cause the detector to produce a visual or audible indication of the presence of the metal.

A primary difficulty which exists in the use of metal detectors is that of distinguishing between metal objects which are valuable, such as coins, jewelry and the like, and metal objects having little value, such as aluminum foil, pull tabs, nails and other ferromagnetic materials. These latter objects can be classified as "trash" as contrasted to the desired or valuable objects which the detector is used to find.

Metal detectors which attempt to distinguish between valuable metal objects and trash have been developed. Since the reactive signal components of the signals detected by the receive coil of the popular transmit/receive metal detectors are 180° out of phase between ferrous and non-ferrous metals, simple slicing circuits have been developed to produce output signals only for non-ferrous objects which are outside a quiescent condition of operation. In theory, such a simple system appears to offer the desired solution. In actual practice, however, the ground effects caused by ferromagnetic minerals in the soil, in the form of ferric oxide and other ferrous materials, create substantial difficulties in setting a proper slicing level because of the varying magnitude of such background of "earth effects" on the operation of the detectors.

To eliminate the "earth effects" or undesirable effects due to ferromagnetic minerals, systems have been developed which are insensitive to ground effects. This has been accomplished, however, at the expense of eliminating the ability of the metal detector to discriminate between ferrous and non-ferrous objects. This result occurs since ground effects produce primarily reactive signal components and produce very little resistive or eddy current signal components in the signal picked up by the receive coil. Metal targets, on the other hand, produce both resistive and reactive voltage components. The resistive signal components, however, produced in the receive coil by metal objects are the same irrespective of whether the objects are ferrous or non-ferrous. It is only the reactive signal components of the targets which provide a capability of distinguishing between desired (non-ferrous) and undesired (ferrous and non-ferrous) metal targets. Thus, if the ground effects are eliminated completely in prior art machines, the desired ability to distinguish between different types of metal targets is lost.

Some prior art metal detectors use a system of inverse discrimination to make the detector relatively insensitive to mineralization changes of the ground. Thus, detectors of this type can be set to be insensitive to undesired non-ferrous materials such as aluminum foil and pull tabs, and changes in the soil mineralization will not change this setting. This, however, is not ground effect rejection.

Other prior art metal detectors using discriminators plus AC coupling attempt to eliminate ground effects but are still subject to false readings if the detector is held on a spot and then pulled away. In addition, such detectors have a very shallow penetration into the ground which renders them of little value.

Another approach in the prior art has been to place two types of instruments in the same housing, that is, a very low frequency ground reject system and a separate discriminator/detector system, and then switch back and forth between the two to provide the operator with a composite set of signals from which he supposedly can determine whether the target found by the detector is a valid "good" target as opposed to an invalid or "bad" target. The ground reject circuit will detect relatively deep metal targets, but it has no discrimination capabilities. The discriminator circuit has discrimination capabilities but with very shallow depth. The result is that the composite instrument is no better than the discriminator circuit portion alone.

Accordingly, it is desirable to provide a metal detector which rejects the effects of ferromagnetic minerals in the soil being searched and which, at the same time, rejects ferrous metal targets along with junk (non-ferrous) metal targets to produce signals only for valuable non-ferrous metal targets such as coins, jewelry and the like.

SUMMARY OF THE INVENTION

Accordingly, it is an object of this invention to provide an improved metal detector.

It is another object of this invention to provide an improved metal detector for locating desired metal objects on or beneath the surface of the earth.

It is an additional object of this invention to provide a metal detector for detecting metal objects and distinguishing between valuable metal objects and ferrous and probably worthless metal objects.

It is yet another object of this invention to provide a metal detector which is minimally affected by the presence of ferrous materials and minerals in the ground over which the detector is used.

In accordance with a preferred embodiment of this invention, a system for detecting metallic objects and for distinguishing between objects of different types includes an oscillator for producing the signals used in the system. The output of the oscillator is connected to a transmit coil mounted in proximity to a receive coil which receives signals transmitted by the transmit coil, modified in amplitude and phase, whenever a metallic object is located in the path of signals transmitted from the transmit coil. The signals from the receive coil are applied to the signal inputs of first and second synchronous demodulators which have signals out of phase coupled from the oscillator to the reference signal inputs. Thus, one of the demodulators functions as a resistive (R) eddy current signal detector while the other functions as a reactive/resistive (X) signal detector. The outputs of the first and second synchronous demodulators then are applied to the signal and reference inputs of a third synchronous demodulator, respectively, to cause the third demodulator to produce a signal at its output which is nearly free of ground effects and also which distinguishes between desired metal targets and undesired metal targets.

BRIEF DESCRIPTION OF THE DRAWINGS

FIGS. 2 through 6 are waveform diagrams useful in explaining the operation of the system of FIG. 1.

DETAILED DESCRIPTION

Figure 1:
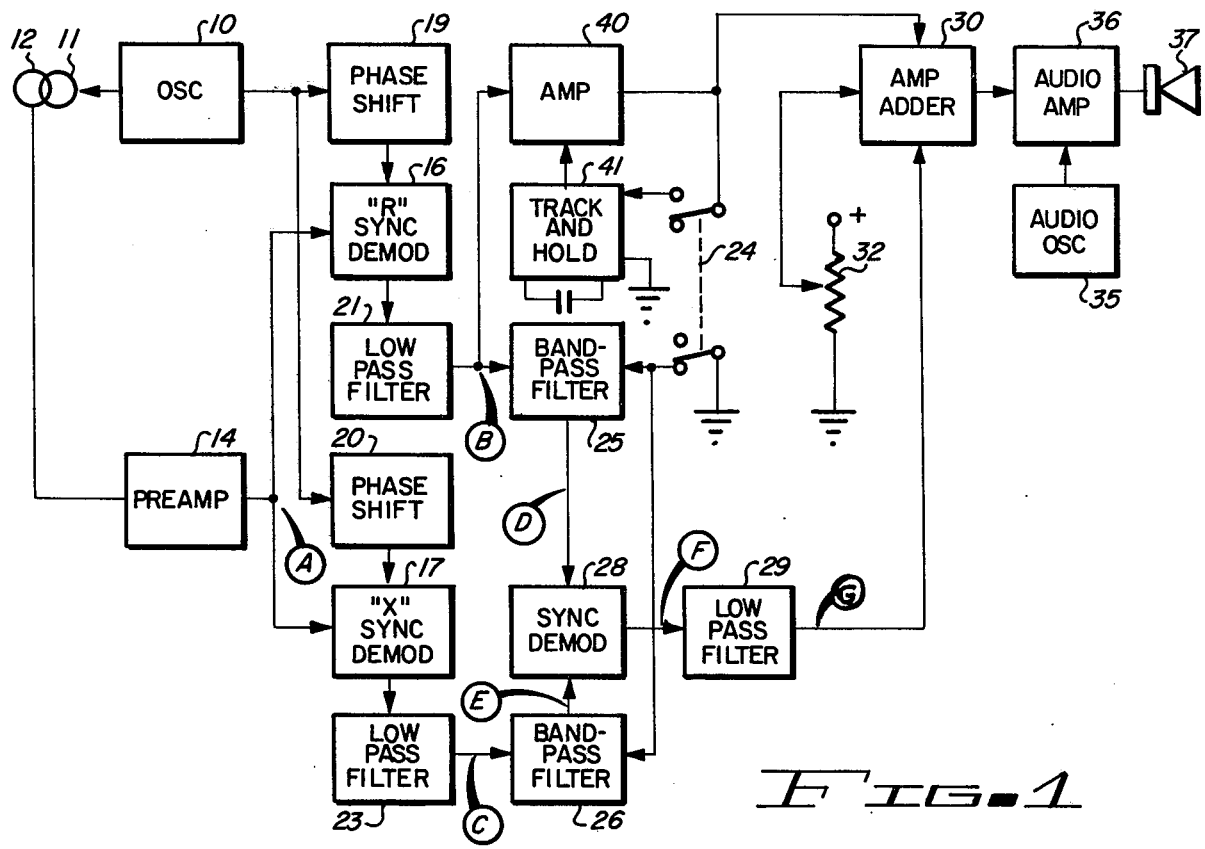
FIG. 1 is a block diagram of a system of a preferred embodiment of the invention.

Referring now to the drawings, FIG. 1 shows a block diagram of a metal detector system in accordance with a preferred embodiment of the invention. This metal detector system effectively eliminates the undesirable effects of mineralization of the ground (ground effects) while at the same time has the ability to distinguish between desired and non-desired metal objects. The system of FIG. 1 is of a type designed to be used in a hand-held, lightweight, portable metal detector which the user sweeps over the ground for the purpose of detecting desirable metal objects such as coins, jewelry and the like.

Operating signals for the detector are generated by an oscillator 10 which supplies these signals to a transmitting coil 11 located in the detector head (the details of which are conventional). A receive coil 12 is positioned in an overlapping fashion with respect to the transmitting coil 11. The positioning of the two coils is adjusted so that there is a null in the receiving coil from the transmitting coil 11 unless the magnetic field between the two coils is disturbed. This field is disturbed whenever a metallic object is placed in it between the coils 11 and 12 to vary the coupling between the coils. As a consequence, whenever a metal target is passed over by the detector head, a signal is received by the receive coil 12 which undergoes an increase in amplitude and at a phase different from the signal supplied by the oscillator 10 to the transmitting coil 11.

Figure 2:
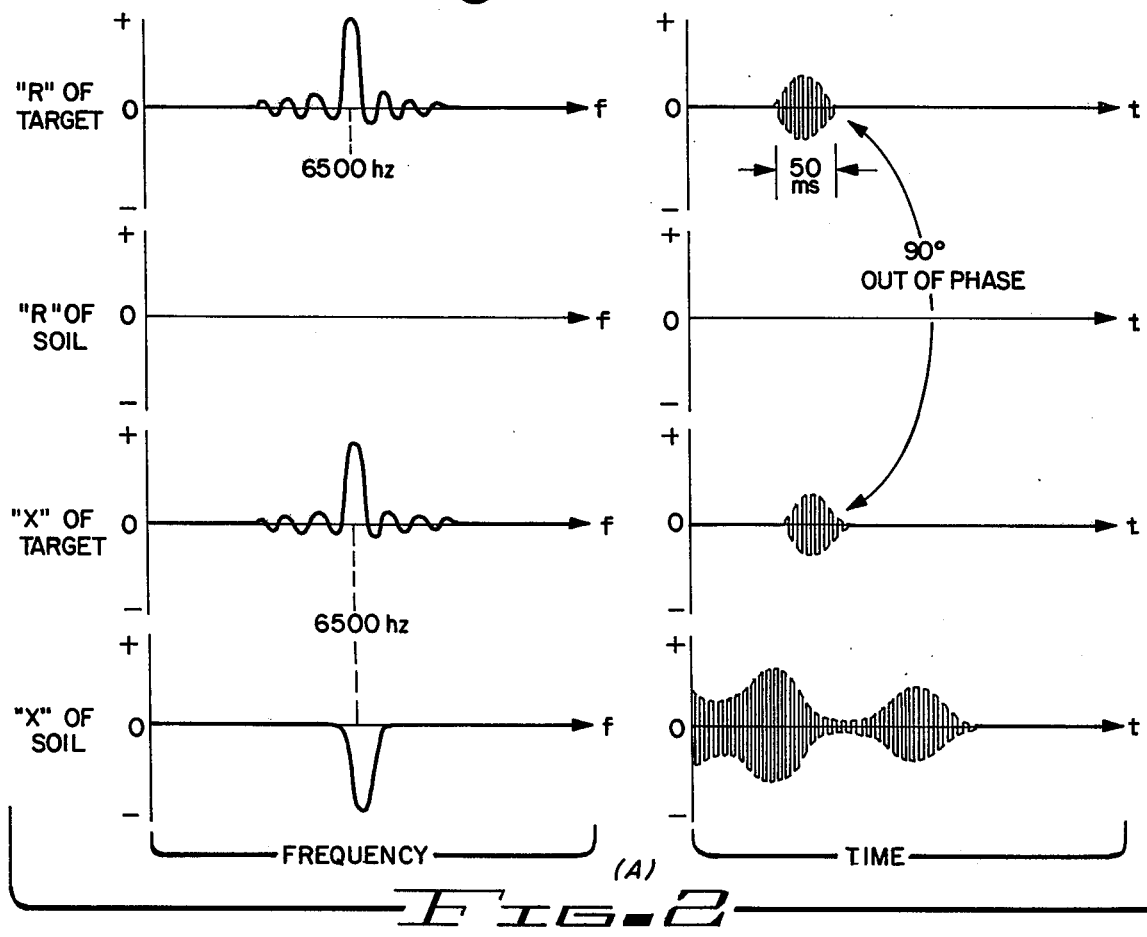

The detected signal obtained from the receive coil 12 whenever a metallic object disturbs the field between the coils is supplied through a conventional preamplifier circuit 14 to produce a signal at Point A. In FIG. 2, the various components of this signal are illustrated to assist in an understanding of the operation of the system. It should be noted that the lefthand portion of FIG. 2 shows typical frequency spectrums of the signals detected by the receive coil 12 as a result of the detection of a metal object as the loop coils 11 and 12 are swept over the soil. In actuality, all of the different signals shown in FIG. 2 are part of a single composite signal which is made up of the various components illustrated. These signals are made up of "R" (eddy current) components and "X" (reactive) components resulting from the metal object (target) and from the ground or soil itself. After adjustment of the phase shift circuit 19, no significant eddy current components are produced by the soil as shown in the frequency spectrum labeled "R of the soil" in FIG. 2. The metallic object or target itself produced both "R" and "X" components which, however, are 90° out of phase with one another. In addition, the mineralization of the soil also produces an "X" or reactive component as shown in the lowermost frequency spectrum of FIG. 2. The amplitude variations of these respective signals with respect to time also are illustrated in the righthand portion of FIG. 2, so that it can be seen that the sweeping of the loop coils 11 and 12 over the ground in the presence of a target generates a signal having a frequency spectrum (left-hand portion of FIG. 2) extending on opposite sides of some central frequency (the oscillator frequency) and, in addition, produces amplitude variations with respect to time (right-hand portion of FIG. 2) in accordance with the particular target which has been detected. The amplitude variations include both reactive (X) and eddy current (R) signal components which are 90° out of phase with one another.

This composite signal from the preamplifier 14 is supplied to the signal inputs of two synchronous demodulators 16 and 17 which constitute the "R" and "X" signal demodulators for the system. The reference signals for these two demodulators 16 and 17 are obtained from the oscillator 10 and are applied through variable phase-shift circuits 19 and 20, respectively, to the reference signal inputs of the demodulators 16 and 17. Although both of the phase-shift circuits 19 and 20 are variable to permit optimum adjustment of the system, these circuits could be fixed phase-shift circuits, if desired.

In setting up the adjustment of the system for operation, the phase of the phase-shift network 19 is adjusted so that the reference phase signal applied from it to the "R" synchronous demodulator 16 differs from the signal input applied to the demodulator 16 from the output of the preamplifier 14 by 90° when a signal produced in the preamplifier 14 is caused by the mineralized soil condition. This is an initial adjustment which is made each time the system is used in a different location. Once this adjustment has been made, the output of the synchronous demodulator 16 is a direct current output which does not change when the coils 11 and 12 are subjected to a varying mineralized soil condition.

As stated previously, the output of the oscillator 10 also is applied to the reference input of the "X" synchronous demodulator 17 through the phase-shift circuit 20. The phase of this signal can be varied by varying the amount of phase-shift produced in the circuit 20. In normal operation, the reference phase of the signal applied from the output of the phase-shift circuit 20 differs from the phase of the signal applied from the output of the preamplifier 14 due to mineralized soil conditions. This phase difference can be adjusted by the operator so as to eliminate unwanted non-ferrous targets along with ferrous targets. To accomplish this, the phase difference between the two inputs to the "X" synchronous demodulator 17 is adjusted somewhere between 0° and 90°. For example, the sensitivity to beverage can pull tabs can be eliminated when this phase difference is typically 45°. However, to reject all ferrous objects and detect all non-ferrous targets, this phase difference is adjusted at 0°. In general, the output of the "X" synchronous demodulator 17 consists of two DC (direct current) voltages. One DC voltage is due to mineralized soil and only changes in magnitude slightly when the phase differences of the inputs to the demodulator 17 are varied. The other DC voltage is due to a target. The polarity of this latter DC voltage can be adjusted to be either positive or negative by changing the phase difference between the two inputs to the demodulator 17.

Both the reactive or "X" components and the eddy current or "R" components of the signal are present when there is relative movement between the target and the transmit/receive coils 11 and 12. The eddy current or "R" component of the signal is present whenever a target disturbs the coupling between the transmit coil 11 and the receive coil 12 irrespective of whether or not there is relative movement between the coil and the target.

The information appearing at the outputs of the synchronous demodulators 16 and 17 is supplied to matched low-pass filters 21 and 23, which in turn are cascaded to matched band-pass filters 25 and 26. The filters 25 and 26 need only be high-pass in nature to reduce soil voltage variations. However, high frequency noise can cause problems if it is coupled through the output demodulator 28. Thus, the filters 25 and 26 are bandpass. These filters also preferably are active filters of conventional design and preferably are constructed by cascading a highpass filter (with large low-frequency roll-off characteristics below 12 Hertz) with a bandpass filter having a center frequency of approximately 20 Hertz. The frequencies handled by the filters 25 and 26 are very low because they are operating on the demodulated signal outputs from the demodulators 16 and 17. These demodulated signals appear at Points B and C respectively, and each of these signals has been divided into its frequency spectrum and its time/amplitude spectrum in the waveforms of FIG. 3. As is apparent from these waveforms, the frequency of the target signal includes a fundamental centered at zero with harmonics extending to over 80 Hertz. However, the majority of target frequency components exists below 40 Hertz. This is true of the frequency spectrum of both the "R" and "X" demodulators 16 and 17. The soil frequency components exist primarily below 10 Hertz. (See FIG. 3 for these relationships.)

The output of the "X" demodulator 17 is identified in FIG. 3 as the "X of target" and is illustrated as a solid line portion and a dotted line portion. These two portions are of opposite polarity and are indicative of good targets (non-ferrous) and ferrous or non-ferrous, unwanted targets, respectively. Desired targets produce the solid line waveform whereas ferrous or unwanted non-ferrous targets are of opposite polarity and produce the dotted line waveform. In addition, it can be seen that the components of the demodulated "X" reactive signal attributable to ground effects or the soil are centered around zero frequency and rapidly decay above 10 Hertz. Thus, the use of a highpass filter circuit in the filter 26 having a low cutoff frequency of approximately 12 Hertz substantially or nearly eliminates the signal components attributable to the ground or soil from the output signal passed by the bandpass filter 26.

A third synchronous demodulator 28 is employed to produce the final output signal from the system. This demodulator is of the same type as the synchronous demodulators 16 and 17; and all of these demodulators may be of standard circuit configurations. The signals obtained from the reactive channel at the output of the bandpass filter 26 comprise the input signals to the demodulator 28, while the signals obtained from the output of the bandpass filter 25 constitute the reference signals for operating the demodulator 28. Thus, it can be seen that the "R" or eddy current portion of the signal is used to produce the reference signal for operating the synchronous demodulator 28 to demodulate the harmonic content of the reactive (X) signal components passed by the bandpass filter 26. This reestablishes the phase of the "X" signal after it passes through the filter 26. The reference signal "D" from the filter 25 and the input signal "E" from the filter 26 have frequency and time spectrums as illustrated in FIG. 4. These signals are either in phase or out-of-phase depending upon whether the target is a desired target or a ferrous or unwanted non-ferrous target as indicated in waveform E of FIG. 4.

The demodulated signals appearing at the output of the demodulator 28 are shown in Point F (FIG. 5), and this signal is passed through a low pass filter 29 to eliminate the higher harmonic content centered around 40 Hertz from it. As illustrated in the waveforms G of FIG. 6, the output of the filter 29 has either the solid line waveform or the dotted line waveform in accordance with whether it is a desired target or a ferrous target. Note that FIG. 6 amplitude/time waveform is similar to that of FIG. 3 except at point "G" the "X" component due to the ground or earth has been removed. Once again, waveforms G have been broken up into separate frequency and time spectrums for the purpose of permitting an analysis of the content of the signal. This signal then is applied to an amplitude adder circuit 30, which operates in the form of a threshold gate, the threshold of which is established by the setting of a potentiometer 32, to apply control signals to an audio amplifier 36. For example, if a desired target is detected and if this target further has an amplitude which exceeds the threshold established by the potentiometer 32, a signal is obtained from the amplifier adder circuit 30 to turn on the audio amplifier 36 permitting signals produced by an audio oscillator 35 to be passed and amplified by the amplifier 36 to a loudspeaker 37. The user of the system then has an audible indication that he is sweeping the transmit/receive coil combination 11/12 over a desired target.

The threshold for the amplifier adder 30 is set at a level sufficient to pass signals to the amplifier 36 which are produced only by desired targets of some predetermined standard. Because metal undesired targets such as aluminum beverage can pull tabs, aluminum foil, and the like produce signals which are of opposite polarity to signals produced by larger desired objects, the system inherently has a capability of making a distinction between these targets. Thus, undesired non-ferrous targets as well as ferrous targets are prevented from producing an audible output in the loudspeaker 37.

In order for this system to produce an output signal in response to a desired target, it is necessary to sweep the system over the target. This produces the harmonics which are needed in the reactive or "X" output from the demodulator 17 for use in substantially eliminating the ground effects from the composite signal (C) in the bandpass filter 26. The system produces no output signals when the transmit/receive head 11/12 is stopped because no harmonics are left to operate the output demodulator 28. In addition, the bandpass filters 25 and 26 should be matched to produce the correct demodulation in the final output from the synchronous demodulator 28.

Since the signals are only produced when the head 11/12 is being moved over a target, the system would have a disadvantage in zeroing in on a detected object to pinpoint its location. To overcome this disadvantage of the system, the switch 24, an amplifier 40, and a track-and-hold circuit 41 are added to the system. For the normal system operation described above, the switch 24 is in the position shown in FIG. 1. This enables or energizes the bandpass filters 25 and 26 for operation. When the switch 24 is moved with both of its contact arms to the other position, the bandpass filters 26 and 26 are disabled. This prevents operation of the synchronous demodulator 28, and no signals are applied from that demodulator to the low-pass filter 29.

At the same time, however, the center position of the switch 24 enables the normally "off" amplifier 40 and track-and-hold circuit 41 for operation. This circuit has applied to it the output of the "R" synchronous demodulator through the low-pass filter 21. Since the demodulator 16 is used to detect or demodulate the eddy current signals produced by a target, signals are produced by the demodulator 16 even when the transmit/receive coils 11/12 are stationary. Thus, a signal, having the component parts shown in waveform B of FIG. 3, is passed through the amplifier 40; and this signal has its maximum strength when the coils 11/12 are centered over or pinpointing the target. These signals are applied to the amplifier adder 30; and if they exceed the threshold established by the potentiometer 32, operate the circuit 30 to gate on the audio amplifier 36 in the same manner described previously.

In operation, the user of the system normally employs the switch 24 in the position shown in FIG. 1 and sweeps the heads 11/12 over the ground in search of a target. When a desired target is found, the loudspeaker 37 produces an audible indication. At this point, the switch 24 then is moved to its other (upper) position and the system merely is used as an eddy current detector to pinpoint the target, which once again is determined by an audible indication in the loudspeaker 37.

A primary advantage of the system is that it effectively eliminates ground effects from having any influence on the indicated output in the loudspeaker 37. In addition, an output is produced only when a desired target is sensed; and no bad object such as aluminum foil, beverage can pull tabs and the like cause an output signal to appear in the loudspeaker 37. The system accurately discriminates between ferrous and non-ferrous objects since the "X" or reactive signal components are used in the detection process as opposed to prior art ground reject machines which eliminate the "X" or reactive components to achieve elimination of ground effects.

In a typical system, the oscillator 10 operates at approximately 6,500 Hertz. The oscillator frequency is not limiting, however, and can be varied either higher or lower. The operating frequency chosen depends upon the desired application the user has in mind. For example, lower operating frequencies produce higher reaction sensitivity of large non-ferrous objects to smaller non-ferrous objects. Higher frequencies produce just the opposite effect.

Variations of the oscillator frequency require adjustments in the relative inductance of the transmit and receive loops but these techniques are well known in this art. When an oscillator having a frequency of 6,500 Hertz is used, the desired operation of the circuit is achieved by using a cascaded 12 Hertz highpass and 20 Hertz bandpass filter for each of the active filters 25 and 26, as described previously. The outputs of these filters then are in the form of 300 millisecond ringing signals used to operate the synchronous demodulator 28.

As stated previously, the synchronous demodulators 16, 17 and 28 may be of a number of conventional types. The particular circuit configuration used for these demodulators is unimportant. The bandpass filters 25 and 26 operate to a great degree in removing the majority of the ground signal applied to them while passing the target signals. This, used in conjunction with the demodulators 16, 17 and 28, permits the system to retain the desirable features of distinguishing between desired metallic targets and undesired metallic targets which are ferrous or which are in the nature of pieces of foil, beverage can pull tabs, and the like, while at the same time effectively eliminating ground pickup.

It also should be noted that the waveform diagrams are shown for a target when the loops 11/12 are swept rapidly at some fixed rate over the ground. If the sweep velocity is changed, either slower or faster, these waveforms will also change.

I claim:

1. A system for detecting metallic objects and for distinguishing between objects of different types including in combination:
    an oscillator;
    a transmit coil coupled to said oscillator for transmitting signals generated by said oscillators;
    a receive coil mounted in proximity to said transmit coil for receiving signals transmitted by said transmit coil, such received signals being modified in amplitude and phase when metallic objects are located in the path of the signals transmitted by said transmit coil;
    first and second synchronous demodulator means for detecting "R" (eddy current) and "X" (reactive) signal components, respectively, each having a signal input and a reference input and each coupled to said receive coil for receiving the signals therefrom on the signal input terminals thereof;
    means for coupling signals from said oscillator to the reference signal inputs of said first and second demodulator means at different relative phases; third synchronous demodulator means having a signal input and a reference input;
    means coupling the outputs of said first and second demodulator means to the signal input and reference input respectively of said third synchronous demodulator means, the amplitude of the output signal from said third synchronous demodulator means being representative of the presence of a metallic object and the polarity of said output signal indicating the type of metallic object being detected; indicating circuit means coupled to the output of said third synchronous demodulator means.

2. The combination according to claim 1 wherein the means for coupling signals from the oscillator to the reference signal inputs of said first and second demodulators comprises phase shift circuits.

3. The combination according to claim 1 wherein said means coupling the outputs of said first and second demodulator means to said third synchronous demodulator means comprises a first bandpass filter coupled between the output of said first synchronous demodulator means and the signal input of said third synchronous demodulator means, and a second bandpass filter coupled between the output of said second synchronous demodulator means and the reference signal input of said third synchronous demodulator means.

4. The combination according to claim 3 wherein said first and second bandpass filters are matched filters.

5. The combination according to claim 3 wherein the bandpass of said first and second bandpass filters has a lower cutoff frequency which is above the highest frequency of signal components produced by ground effects in the outputs of said synchronous demodulator means.

6. The combination according to claim 1 wherein said indicating means comprises an audio oscillator and an audio amplifier coupled to a loudspeaker; and the signal produced by the audio amplifier is controlled by gating circuit means coupled to the output of said third synchronous demodulator means.

7. The combination according to claim 6 further including additional circuit means coupling the output of said second synchronous demodulator to said gating circuit means; and switch means for selecting control of said gating circuit means by one of said third synchronous demodulator means and said additional circuit means.

8. The combination according to claim 7 wherein the output of said third synchronous demodulator means is coupled to the input of said gating circuit means through a low pass filter.

9. The combination according to claim 8 wherein said means coupling the outputs of said first and second demodulator means to the signal input and reference input of said third synchronous demodulator means comprise first and second bandpass filter means, respectively.

10. The combination according to claim 9 wherein said first and second bandpass filter means each are selected to have a lower cutoff frequency which is above the upper range of frequencies produced by ground effects in the output signal from said first synchronous demodulator means when said transmitting and receiving coils are moved over the surface of the ground.

* * * * *